(No Model.)
W. G. HAMILTON.
CAR WHEEL.
No. 303,509. Patented Aug. 12, 1884.
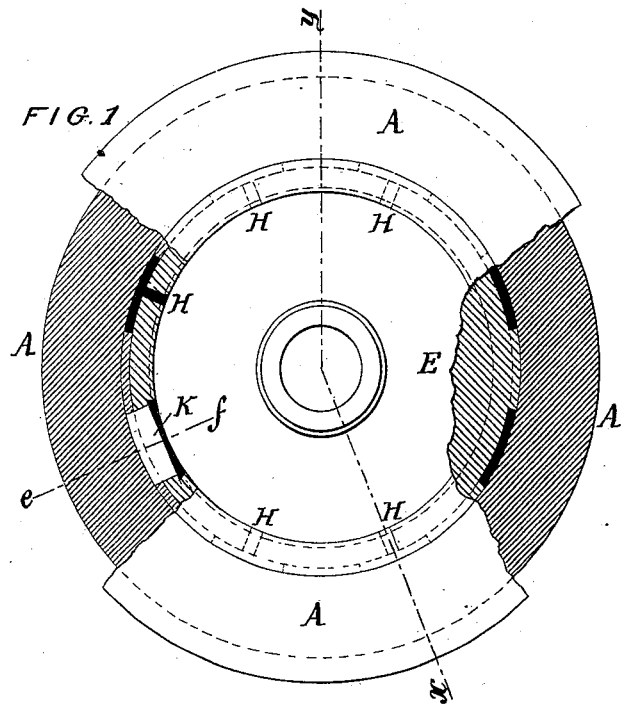
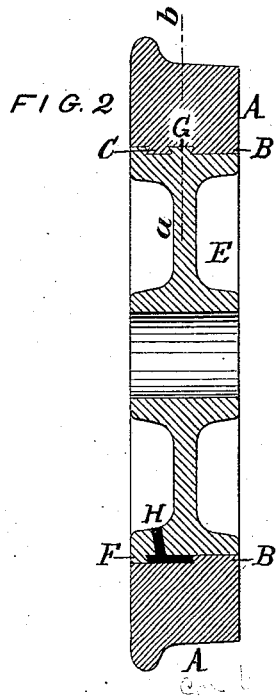
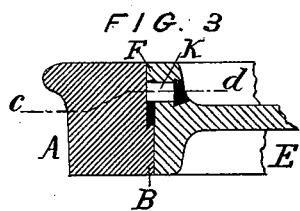
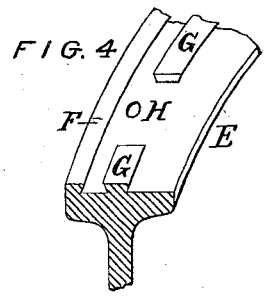
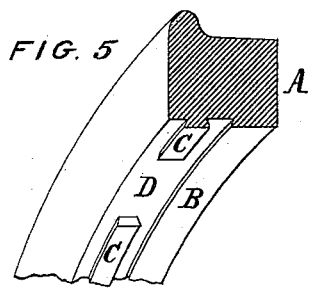
Witnesses:
J. Walter Douglass
Thos. M. Smith
Inventor:
Wm. G. Hamilton, by
Henry Baldwin Jr.
Attorney.

UNITED STATES PATENT OFFICE.

WILLIAM G. HAMILTON, OF RAMAPO, NEW YORK.

CAR-WHEEL.

SPECIFICATION forming part of Letters Patent No. 303,509, dated August 12, 1884.

Application filed March 27, 1884. (No model.)

*To all whom it may concern:*

Be it known that I, WILLIAM G. HAMILTON, of Ramapo, in the county of Rockland and State of New York, have invented a certain new and useful Improvement in the Manufacture of Railroad-Car Wheels, of which improvement the following is a specification, reference being had to the accompanying drawings, which form part hereof.

The advancing requirements of railway traffic, and especially of passenger-service, have for some years demanded a class of wheels which cannot be made from the ordinary materials and by the ordinary processes of casting, and various attempts have been more or less successful in furnishing wheels of great strength and durability, without being too heavy, by making the center and tire separate, and respectively of different metals, (iron and steel,) and uniting them in a variety of ways, sometimes directly, but more generally with interposed pieces of wood, paper, and other elastic materials. As distinguished from wheels cast in one piece or one mass of metal, these may be designated as "compound car-wheels," and the component parts have in most instances, so far as I know, been secured together, in addition to the heavy pressure employed in some cases and the shrinking of the one upon the other; in other cases by bolts and similar fastenings applied with great diversity of mechanical details, but uniformly with relatively great expense, and they are all liable to fractures, in which case one part is liable to fly off from the other, while the bolts themselves tend to become loose and demand careful and constant watching. As to that class of compound wheels in which a soft or elastic material is interposed between the body or center and the tire, they are even still more expensive in point of labor, and also still more liable to difficulties arising from the shrinkage or crushing of the intermediate soft material and the consequent loosening of these parts. In point of fact, the cost of the "paper-wheel," as it is called, and of the "wooden-cushioned wheel," as I may designate it, is practically prohibitory, except for palace or sleeping cars, or trains on which an extra fare is charged, and the use of such compound wheels is exceedingly restricted. Among other constructions by which inventors have attempted to bring compound wheels within the limits of economical availability, a large number have been based upon the plan of combining a steel or iron tire with a steel or iron center or body, the interior of the tire and the circumference of the body being provided with tongues and grooves or other forms of projections and depressions, the one fitting into or over the other, and all being secured together by bolts. Generally speaking, this class of compound wheels is made up of a solid tire and a compound center—that is to say, the center is itself composed of separate parts— the hub proper being connected with the tire through spokes or plates, or through a single web attached to the hub proper by bolts, or the hub passing through them centrally, as the case may be, and the outer ends or edge being of course secured to or upon the inner surface of the tire, while, in the case of plates, bolts are usually passed through them from outside to outside between the hub and the tire, in addition to the tongues and grooves or other irregularities of the surfaces already referred to, and the edges of the tire or of the plates being, in some cases, upset. Another variety of wheel may be classified as a compound wheel, though it differs from those already mentioned in its mode of construction. In this case the tire has a dovetailed groove in it, the outlines of this groove being the counterpart of the circumference of the web or body of the wheel, and the web or body is cast in this groove, where it is of course interlocked in the dovetail of the tire, and thus being also connected with it by cohesion between the metals, no bolts or other attachments are required, and this may be taken as the most improved application, so far as I know, of the very old system of making a wheel by casting metal upon metal. There are various modifications of this plan, the body of the wheel being more or less made up of parts and united to the tire by the metal cast upon them; but recurring to the before-mentioned class of compound car-wheels in which wood is interposed between the metal center or body and the tire, I now refer specifically to the construction shown and described in Letters Patent No. 278,726, issued to John R. Morgan, under date of June 5, 1883. In this instance the metal body is provided around its rim or periphery with a series of equidistant bifurcated projections, the recesses in which are cut away or inclined inwardly, so as to have a dovetailed shape. The inner circumference of the annulus, which constitutes the tire, is provided with a series of equidistant solid projections, corresponding in number and position with the spaces between the bifurcated projections on the body or center, and corresponding in form and dimensions with the recesses in the bifurcations on the body or center, so that when both are in a horizontal position the body can be slipped into the tire, and the tire being then turned partly around upon the body or center, the solid projections on the inner surface of the tire will dovetail into the bifurcated recesses on the body or center, and the two parts of the wheel will be interlocked between the several dovetails thus formed at intervals around them. It will be seen, however, that, although thus interlocked, the two parts of the wheel are not yet secured together so as to be capable of use, and the patent referred to accordingly describes the further steps of this construction as consisting in driving into the open spaces left between the interlocked projections, and which open spaces extend through from one side of the wheel to the other, a series of prepared wooden cushions shaped to fit snugly in these spaces, and thus complete the wheel, the entire operation being performed while the parts are cold. Railroad men will readily understand that this construction is scarcely adequate to the requirements of the service. The action of the brakes upon car-wheels is very severe, and when the direction in which the wheel revolves is changed and the action of the brakes reversed, as constantly must be the case, it is extremely questionable whether the wooden cushions would withstand the crushing or compressing strains to which they must be subjected in practice, even if we take no account of the swelling and shrinkage of such cushions in wet or dry weather, and in case of shrinkage or compression these cushions would soon be worked out of the spaces, open from one side of the wheel to the other. Moreover, the tendency of the body or center and of the tire to turn in opposite directions would soon lead to an uncoupling or a loosening of the dovetails if the wooden cushions dropped out or ceased to keep the interlocking projections snugly in place, and as the wheel is put together when the parts are all cold there is in this instance less tightness of fit between the body and the tire than when the latter is shrunk upon the former.

Now, it is the object of my invention to manufacture a compound car-wheel entirely of metal, and while forming the tire and the body or center separately, to unite them without bolts in such manner that they will form practically a solid metal wheel, and so that even in case of fracture the fractured part cannot fly off, while at the same time I retain the greatest facility for removing and replacing either part of the wheel in which fracture occurs.

In the accompanying drawings I have exemplified the peculiarities of my invention by showing a wheel embodying the principles of my improved construction, Figure 1 being an elevation of such a wheel, the outer surface being broken away on opposite sides, so as to show on the right hand a section through the line $a\,b$ of Fig. 2, and on the left hand a section through the line $c\,d$ of Fig. 3. Fig. 2 is a transverse section through the wheel on the line $x\,y$ of Fig. 1. Fig. 3 is a section through Fig. 1 on the line $e\,f$. Fig. 4 is a perspective view of a portion of the circumference of the body or center of the wheel, and Fig. 5 is a corresponding view of a portion of the inner face of the tire.

The tire A of my improved wheel may be made of cast-iron, of wrought-iron, of steel, or of any other suitable metal susceptible of the necessary treatment. Externally it is of the usual form, having a tread and flange adapted to its intended service. Internally it has a continuous shoulder, B, formed by making about one-half of the depth of the tire thicker, and consequently smaller than the outer half, this inwardly-thickened part of the tire being on the side opposite the flanged or outwardly-thickened part, as shown. About midway between this shoulder and the outer edge or surface of the tire I form upon the inner face of the tire a series of projections or lugs, C, standing out at right angles to the face, the faces of these projections or lugs being flush with the inner surface of the continuous shoulder. These projections or lugs are placed equidistantly around the surface, and are separated from each other by spaces D, which are preferably somewhat wider than the lugs themselves. The number and the length and thickness of these lugs will be determined by the draftsman in apportioning their distribution and strength, respectively, with reference to the functions they are to perform. The best practice will dictate that the edges of the lugs shall be inclined toward the face of the tire upon which they are formed, in order to give them a dovetailed shape, and the surface of the shoulder B might also be inclined inward. The center or body E, also of metal, is either wrought or cast in the ordinary manner or built up upon any desired plan compatible with its adaptation to the peculiar construction of the tire. It has an extreme diameter on its inner surface, such as will just admit of its being properly fitted into the tire from the outer or larger side. This extreme diameter is continuous, and has a thickness equal to the depth or vertical distance between the outer face of the tire and the upper plane of the lugs C, so that it constitutes a continuous flange, F, and when the two parts are put together the outer surface of the body or center will be flush with the adjacent outer surface of the tire, while the lower surface of this continuous flange on the body will rest evenly upon the top surfaces of the lugs C. Below the continuous flange F, thus formed upon its inner face, the diameter of the body or center E is reduced, so that it is just such as will admit of its being properly fitted into the thicker smaller part of the tire, and the depth or thickness of this reduced part of the body or center is just such that (when the under side of the continuous flange rests upon the upper surfaces of the lugs C, and the upper or outer surface of this flange is flush with the outer surface of the tire, as already mentioned) the inner surface of the body or center is flush with the inner surfaces of the tie, and thus there is a continuous and practically unbroken face to the wheel on both sides, without any piecing or breaking of either surface and without any interstices to be filled or exterior fastenings to be applied.

At the proper distance or depth below the under side of the flange F, and at the proper height above the inner side or edge of the body or center, I form upon the circumference of the body a series of projections or lugs, G, corresponding in number and length with the spaces between the lugs C on the tire A. In thickness and configuration or outline these lugs G are respectively counterparts of the spaces between the lugs C and the shoulder B on the tire. The tire and the body being thus adapted for each other, the tire A is heated up properly, and, being suitably supported upon its inner or under side, the body or center E is fitted into it by slipping the lugs G down through the spaces between the lugs C until the lugs G rest upon the shoulder B, when the body is turned upon the shoulder (while the tire is still expanded by heat) until the lugs G are brought under the lugs C, and thus a series of strong interlocking dovetailed joints are made, and the tire being now allowed to cool, it shrinks upon the body, and the wheel is practically a solid wheel, the only openings or spaces in it being those between the series of dovetails and these spaces being inclosed between the shoulder B and the flange F. To fill these spaces and to make the wheel actually solid, I provide in the body E a series of holes, H, extending through the body below the flange F and between the lugs G. I run soft metal through these holes until the spaces left between the dovetailed joints are filled, and this serves an additional object by keying the tire and body together, so as to effectually prevent their being uncoupled or turned either way, one upon the other, under the reversed strains of the brakes already mentioned.

As a further or as an alternative method of securing the wheel against any tendency of the tire or the body to turn one upon the other, I provide a slot through the body immediately under the flange F, and at a point which will bring this slot opposite one of the spaces between the dovetailed joints, when the wheel is completed, and into this slot I drive a metal key or wedge, K, which fills the space between two of the dovetailed joints and bears against the two adjacent joints, as well as upon the shoulder B and the flange F. To hold this key in place I run soft metal upon it or pin it to the body or center, or otherwise secure it against displacement by any of the numerous simple expedients resorted to in analogous cases. It will be seen that with the dovetailed joints on the interior of the wheel, and with the shoulder B on one side and the flange F on the other side of the exterior of the wheel, it is impossible for any part either of the body or of the tire to fly off, however badly the wheel may be fractured, and on the other hand, the tire being shrunk upon the body, and a broad bearing being thus afforded to one part by the other, the wheel is as solid as it is strong.

To take the wheel apart, it will only be necessary to heat it up until the tire is properly expanded and the soft-metal fillings are melted, when (the keys being removed, if keys are used) the body is turned until the lugs G come into the spaces between the lugs C on the tire, and the body can be lifted out.

It is to be understood, of course, that while I have thus described the most approved application of my improvements, I do not confine myself to the precise details of construction herein shown and described, as it is obvious, for example, that the described constructions of the tire and of the body or center might be reversed, or the respective constructions of the tire and of the body might be varied in various ways—as, for example, by forming the flange on the outer side of the body, and the shoulder on the inner side of the tire, and correspondingly changing the arrangements of the projections, recesses, and spaces—without departing from the principle of my invention.

Having thus described the nature and object of my invention, what I claim as new, and desire to secure by Letters Patent, is—

1. The shouldered tire provided with projections or lugs, and having spaces and recesses between the lugs and the shoulder, substantially as and for the purposes described.

2. The flanged body or center provided with projections or lugs, and having spaces and recesses between the lugs and the flange, substantially as and for the purposes described.

3. The combination of a shouldered tire and a flanged body or center, respectively provided with lugs and recesses and spaces, substantially as described, whereby the exterior surfaces of the wheel are made practically continuous, and the spaces between the dovetailed joints are inclosed between the shoulder and the flange, as set forth.

4. The combination, with the shouldered tire and the flanged body or center provided, respectively, with lugs and recesses and spaces, substantially as described, of the key K, substantially as and for the purposes set forth.

WM. G. HAMILTON.

Witnesses:
CHARLES F. ZIEGLER,
J. WALTER DOUGLASS.